United States Patent [19]

Craft

[11] 3,714,583

[45] Jan. 30, 1973

[54] MUTING CIRCUIT

[75] Inventor: Jack Craft, Somerville, N.J.

[73] Assignee: RCA Corporation

[22] Filed: Aug. 26, 1970

[21] Appl. No.: 67,009

[52] U.S. Cl. ....................325/348, 325/455, 325/478

[51] Int. Cl. ..............................................H04b 1/10

[58] Field of Search......325/348, 401, 403, 478, 456, 325/469, 474, 67, 349; 174/15 ST

[56] References Cited

UNITED STATES PATENTS

| | | | |
|---|---|---|---|
| 2,261,951 | 11/1941 | Bloch | 325/474 |
| 3,238,457 | 3/1966 | Broymel et al. | 325/67 |
| 3,569,633 | 3/1971 | Brahman | 325/348 |
| 2,914,664 | 11/1959 | Paul | 325/348 |

*Primary Examiner*—Robert L. Griffin
*Assistant Examiner*—Donald E. Stout
*Attorney*—E. M. Whitacre

[57] ABSTRACT

A muting circuit for FM receivers utilizing an envelope detector, DC coupled inverter amplifier, and hole rectifier circuit at the limiter output to generate a control voltage inversely proportional to the usable input signal wave, which is independent of receiver gain, for quieting a receiver below minimum usable signal wave levels.

9 Claims, 11 Drawing Figures

INVENTOR.
Jack Craft
BY Martin Sachs
ATTORNEY

CARRIER ONLY

CARRIER PLUS ANTI-PHASE NOISE

CARRIER PLUS IN-PHASE NOISE

INVENTOR.
Jack Craft
BY Martin Sachs
ATTORNEY

MUTING CIRCUIT

This invention relates to quieting receivers and more particularly to automatic muting circuits for quieting an FM receiver when the received modulated signal wave falls below a minimum usable signal level, suitable for fabrication on a monolithic integrated circuit chip.

The term angle modulation, as used herein, refers to frequency or phase modulated waves or waves modulated in both frequency and phase and will henceforth be referred to as FM. The term integrated circuit, as used herein, refers to a unitary or monolithic semiconductor structure or chip incorporating the equivalent of a network of interconnected active and passive electrical circuit elements such as, transistors, diodes, resistors, capacitors and the like.

One of the many advantages obtained in using frequency modulation (FM) techniques for the transmission of audio information is relative freedom from reproducing extraneous noise signals appearing with the information signal. However, there are other types of noise which are not completely eliminated in FM transmissions such as interstation noise, noise characteristic of very weak signals, and the side tuning responses characteristic of conventional FM receivers.

The present invention is directed to the reduction and elimination of these latter types of noise. This is accomplished by detecting the holes or troughs in the signal-plus-noise envelope and controlling the audio output so that the muting automatically occurs at the minimum usable signal level and is substantially independent of receiver gain. The present embodiment of the invention utilizes a minimum of components and is suitable for fabrication on a monolithic integrated circuit chip.

In accordance with a preferred embodiment of the invention, a muting circuit or hole detector is fabricated on a monolithic integrated circuit chip comprising an envelope detector followed by an inverter amplifier and a hole rectifier which provides a control voltage proportional to the holes or troughs in the input signal. The hole detector, in the present embodiment of the invention is a small portion of a complete integrated circuit chip and cooperates with the output section appearing on the chip. By way of example of a complete integrated circuit chip which utilizes the present invention refer to a concurrently filed copending application, Ser. No. 66,945 filed Aug. 26, 1970 by Jack Avins, now U.S. Pat. No. 3,667,060 and assigned to the same assignee as the present invention.

A complete understanding of the invention may be obtained from the following detailed description, when taken in conjunction with the accompanying drawings, in which.

Figure 3A:
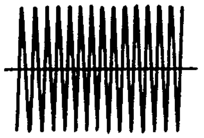
Figure 3B:
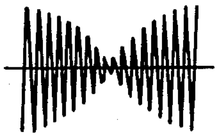
Figure 3C:
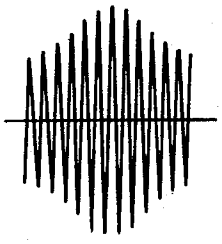
Figure 4A:
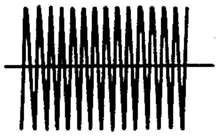
Figure 4B:
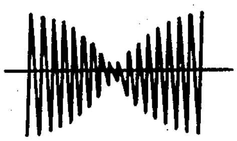
Figure 4C:
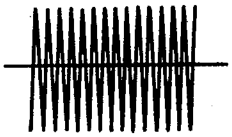
Figure 5A:
Figure 5B:
Figure 5C:
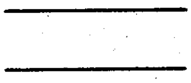

FIGS. 3A, 3B, and 3C are pictorial representations of a signal wave under various noise conditions before limiting;

FIGS. 4A, 4B, and 4C are pictorial representations of a signal wave under various noise conditions after limiting; and FIGS. 5A, 5B, and 5C are pictorial representations of a signal wave under various noise conditions after envelope detection.

Figures 1, 2:
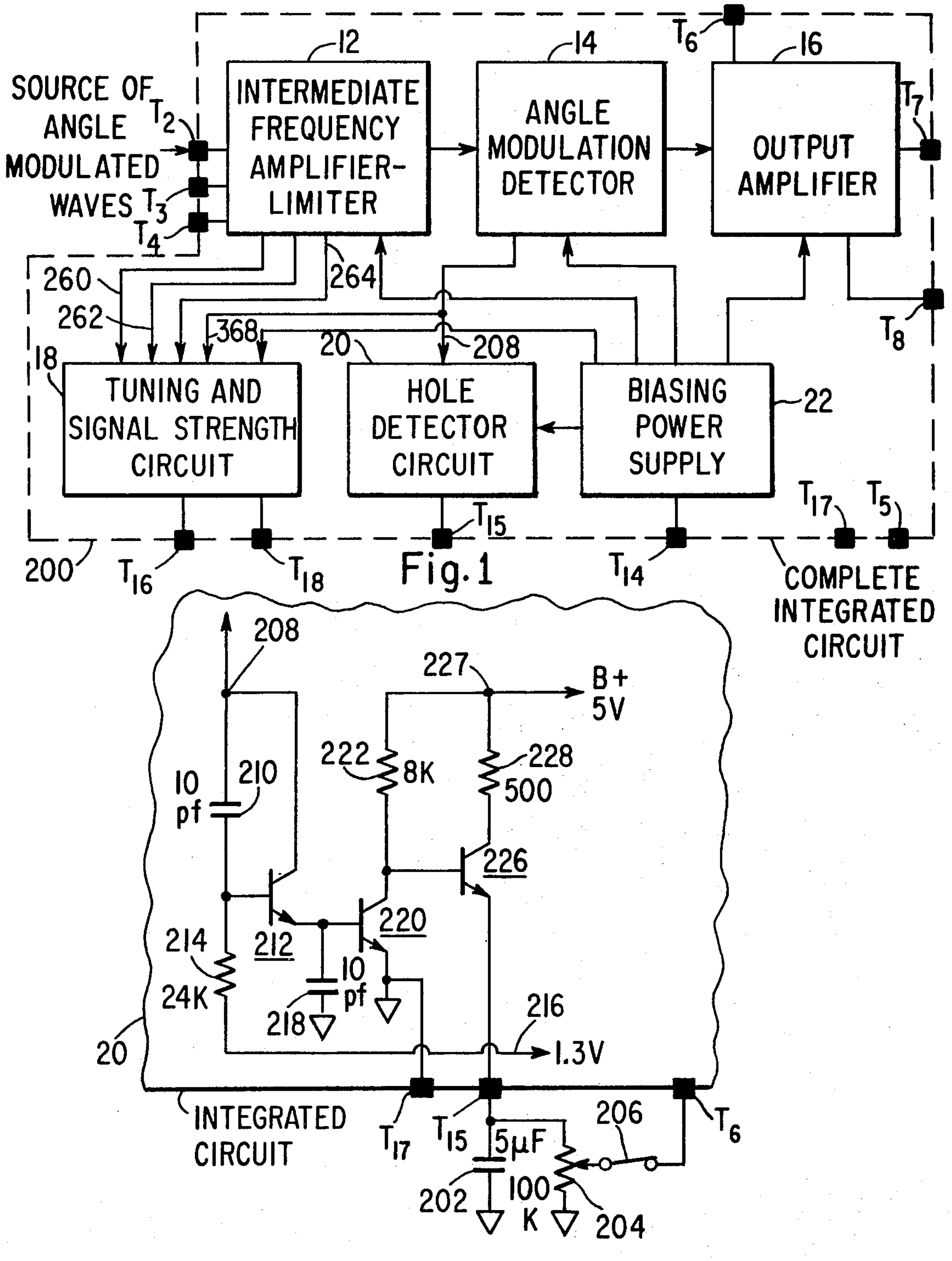
FIG. 1 is a functional block diagram of a monolithic integrated circuit chip including a hole detector circuit embodying the present invention.
FIG. 2 is a schematic circuit diagram of a hole detector circuit shown in block form in FIG. 1.

Referring to the drawings, FIG. 1 is a functional block diagram of a complete integrated circuit chip indicated by the dotted line 200, wherein angle modulated waves are introduced to the integrated circuit chip at terminals T2 and T3. The integrated circuit chip 200 has a plurality of terminals T2–T18 located about its periphery for supplying inputs to the chip and taking outputs from the chip. The angle modulated waves are amplified and limited by the intermediate frequency amplifier-limiter 12, which may include several translating amplifier stages.

The limiting function of IF amplifier-limiter 12 acts to remove the amplitude modulation of the frequency modulated wave envelope.

By way of example, the circuitry incorporated in the IF amplifier-limiter 12 of the integrated circuit chip 200 may be of the type described in a concurrently filed, copending application of Jack Avins Ser. No. 66,921 filed Aug. 26, 1970, now U.S. Pat. No. 3,678,405 and assigned to the same assignee as the present invention.

Also arranged on the chip 200 is angle modulation detector 14 which is coupled to an output of the intermediate frequency amplifier-limiter 12 to derive the modulation components from the amplified and limited wave and apply these components to an output amplifier 16. The output signal from the output amplifier 16 is coupled to terminal T7 on the integrated circuit chip 200 and is applied to suitable utilization means, not shown.

A second output signal is obtained from the output amplifier 16 and is coupled to terminal T8 and provides an automatic frequency control current (AFC) which can be used to control the frequency of a local oscillator, not shown, included in a signal wave receiver in which the integrated circuit chip may be used. By way of example, the circuitry incorporated in the output amplifier 16 may be of the type described in a concurrently filed copending application Ser. No. 66,973 of Jack Craft filed Aug. 26, 1970, now U.S. Pat. No. 3,678,403 and assigned to the same assignee as the present invention.

The translating amplifier stages of the IF amplifier-limiter 12 are also coupled to the tuning and signal strength circuit 18 via conductors 260, 262, 264, respectively. The tuning and signal strength circuit 18 is further coupled to an output of the frequency modulation detector 14, via conductor 368, and provides an AGC voltage at terminal T18, which is coupled to a preceding RF or IF translating stage not shown. The tuning and signal strength circuit 18 also provides at terminal T16, an output voltage proportional to signal strength, for utilization by a tuning indicator, not shown.

The hole detector circuit 20 is also coupled to an output of the angle modulation detector 14 and in accordance with the principles of the present invention provides a muting voltage at terminal T15 for utilization by the output amplifier 16.

By way of example, the circuitry incorporated in the tuning and signal strength circuit 18 may be of the type described in concurrently filed copending application Ser. No. 67,010 of Jack Avins and Jack Craft filed Aug. 26, 1970, now U.S. Pat. No. 3,673,499 and assigned to the same assignee as this invention.

Also included on the integrated circuit chip 200 is the biasing power supply 22 which provides the required bias voltages for proper operation of the intermediate frequency amplifier-limiter 12, the angle modulation detector 14, the output amplifier 16, the tuning and signal strength circuit 18, and the hole detector circuit 20, from the potential applied at terminal T14.

An example of the type of biasing power supply 22 that may be used may be found in a concurrently filed copending patent application Ser. No. 67,010, now U.S. Pat. No. 3,673,499 referred to above.

The schematic circuit diagram of the hole detector circuit 20, incorporating the principles of the present invention, is shown in FIG. 2 and is comprised of an envelope detector transistor 212, an inverter amplifier transistor 220 and a hole rectifier transistor 226.

Point 208 is connected to a source of frequency modulated signal waves, which in the present embodiment of the invention is obtained from the frequency selective quadrature circuit of the angle modulation detector 14. The input frequency modulated signal is coupled, via point 208, to the collector electrode of envelope detector transistor 212 and to the base electrode of this transistor through a capacitor 210. The base electrode of transistor 212 is coupled by a resistor 214 to a point 216 which is a source of DC bias voltage (approximately 1.3 volts). This voltage is derived from the biasing power supply 22 and the bias circuits described in the copending application referred to above, Ser. No. 67,010, now U.S. Pat. No. 3,673,499.

The emitter electrode of transistor 212 is coupled to ground via integrating capacitor 218. The emitter electrode of transistor 212 is also directly coupled to the base electrode of inverter amplifier transistor 220. The emitter electrode of transistor 220 is coupled to output ground terminal T17. The collector electrode of transistor 220 is coupled through transistor 222 to a source of positive voltage (approximately 5V, at point 227).

The time constant of envelope detector transistor 212 is determined by capacitor 218 and the distributed capacitance in combination with the shunt resistance at the base electrode of transistor 220. The time constant is short enough to follow variations in the envelope up to a frequency of several hundred kilohertz.

The collector electrode of transistor 220 is coupled to the base electrode of hole rectifier transistor 226 which functions to rectify the positive peaks corresponding to the holes in the envelope. The collector electrode of transistor 226 is coupled through resistor 228, via point 227, to a source of B+, (approximately 5 volts) while the emitter electrode of transistor 226 is coupled to terminal T15 from which the DC control voltage is obtained.

Terminal T15 has an external capacitor 202 connected between it and ground terminal T17 for integrating purposes. Across integrating capacitor 202, is connected a potentiometer 204. The time constant of capacitor 202 and potentiometer 204 is in the order of 0.1 second. Between the movable contact arm of the potentiometer 204 and terminal T6 on the integrated circuit chip 200 is connected a switch 206.

The DC control voltage obtained at the movable contact arm of potentiometer 204 is used to reduce the gain of (mute) output amplifier 16 shown in FIG. 1. By way of example, an output amplifier such as output amplifier 16, which is the type of amplifier that may have its gain reduced by a circuit incorporating the principles of the present invention, is disclosed in the copending application referred to earlier Ser. No. 66,973, now U.S. Pat. No. 3,678,403.

The operation of the muting circuit may be explained as follows. The FM input signal wave applied to point 208 is detected by the base-emitter junction of transistor 212 and stored in capacitor 218.

The detected envelope, under weak signal or noisy conditions, exhibits downward variations in amplitude corresponding to momentary or partial cancellation of the noise and signal components. In the absence of a signal wave, transistor 220 is biased essentially to cutoff by a bias voltage (1.3 volts) appearing at point 216. In the presence of a signal wave, capacitor 218 charges toward the peak value of the input signal wave and, therefore, causes the current of transistor 220 to increase, thus driving down the collector of transistor 220 thereby cutting off transistor 226 and at the same time permitting capacitor 202 to discharge through resistor 204.

In the presence of a signal wave, therefore, the potential across capacitor 202 will be small. As the signal wave strength is decreased toward the threshold value of input where the noise and the signal wave become comparable, the effect is to momentarily cut off transistor 220 during the time of the noise cancellations of holes in the detected envelope, therefore, charging capacitor 202 to a higher value of voltage than when only signal is present without noise. If desired, the control or muting voltage can be made adjustable by means of potentiometer 204.

The control voltage is then coupled to the output amplifier 16 in a manner suitable for reducing the output amplifier gain under weak signal conditions. A switch 206 which is incorporated between the movable contact arm of potentiometer 204 and terminal T6, provides the option of removing the operation of the hole detector circuit 20.

The action just described may be more easily visualized with reference to FIGS. 3, 4 and 5.

FIG. 3A is a pictorial representation of a carrier wave without noise; FIG. 3B is a pictorial representation of a carrier wave with anti-phase noise superimposed; and FIG. 3C is a pictorial representation of a carrier plus in-phase noise superimposed. All of the pictorial representations in FIG. 3 above represent the signal prior to limiting action.

FIGS. 4A, 4B, and 4C are a pictorial representation of the signal with the same characteristics of FIG. 3 but after limiting action has occurred. It will be noted that in FIG. 4B the anti-phase noise is not affected by the limiting action, while the in-phase noise of FIG. 4C is substantially removed by the limiting action. FIG. 5 is a pictorial representation of the same signals after detection of the signal envelopes by the envelope detector transistor 212.

It is to be noted that in FIGS. 5A and 5C a steady state DC potential is obtained, while the detected signal with anti-phase noise shown in FIG. 5B creates a varying DC which is used to develop the DC control voltage after passing through amplifier inverter transistor 220. The magnitude of this varying DC voltage depends upon the depth and repetition rate of the holes on the carrier so that as the carrier signal falls progressively into the background noise, the magnitude of the control voltage increases and the output is progressively muted. The control voltage thus developed is responsive to the degree to which noise cancellations of carrier and noise occur and is, therefore, an excellent measure of the signal-to-noise ratio.

The voltage appearing at terminal T15 changes from a value "with signal" of approximately 0.75 volts to a "no signal" voltage of 2.9 volts. The "no signal" voltage of 2.9 volts occurs between terminal T15 and ground (T17). This muting voltage is capable of decreasing the output stage gain by more than 40dB, thereby, effectively quieting the output of the amplifier whenever the signal-to-noise ratio deteriorates.

An important advantage of the present embodiment of the invention is that it is inherently responsive to the absolute signal-to-noise ratio of the input signal and is therefore substantially independent of the gain of the RF and IF amplifier sections of the receiver and may be fabricated on a monolithic integrated circuit chip. A further advantage is that the muting threshold inherently occurs in the region where signal and noise are comparable so that holes are developed. This is substantially the region where the signal-to-noise ratio of the demodulated signal is at the threshold of being usable. As a result, the need for a threshold control can be eliminated without sacrificing the ability to mute or squelch at the optimum threshold of noise quieting.

Another advantage is obtained by the response of the muting circuit in suppressing the two spurious side responses which are particularly strong in FM receivers utilizing a limiter-discriminator circuit as opposed to a ratio detector. These receivers exhibit a tuning characteristic in which the two undesired side responses are typically as strong as the main desired response. These spurious side responses are greatly attenuated by the muting circuit disclosed herein. As the receiver is tuned off frequency, the selectivity of the filter at the input of the IF amplifier causes the signal to slide down the steep skirts of the filter and approach the noise level. Under these conditions, the holes, which are generated in the envelope of the input signal wave to the hole detector, causes the undesired spurious side responses to be substantially attenuated. This effect is substantially enhanced when the drive to the muting circuit is taken from a frequency selective circuit in the phase shift path of the FM detector.

In addition, the muting circuit is capable of suppressing undesired beats occuring between adjacent channel signals as the receiver is being tuned across the band. For example, a 200 KHz beat is formed when tuning between two adjacent signals and during the tuning interval. When the two signals at the input are comparable in level, the beat pattern and resulting holes or troughs appearing in the envelope cause the muting circuit to develop a voltage which attenuates the annoying interference which otherwise would be present.

Thus, there has been disclosed a muting circuit for an FM receiver for quieting a receiver below minimum usable signal wave levels suitable for fabrication on a monolithic semiconductor chip which is independent of receiver gain.

What is claimed is:

1. In an angle modulation receiver adapted for providing information angle modulated on a carrier wave, said carrier wave being characterized by a reduction in amplitude in the presence of noise, the combination comprising:

an angle modulation detector including frequency responsive means for supplying an angle modulated carrier wave;

means coupled to said frequency responsive means for detecting the envelope of said angle modulated carrier wave;

means direct current coupled to said detecting means for inverting said detected envelope;

biasing means coupled at least to said inverting means for biasing said inverting means in the vicinity of a conduction threshold; and rectifying means direct current coupled to said inverting means, for providing a DC voltage representative of troughs in said angle modulated carrier wave suitable for reducing the gain of an associated output amplifier.

2. In apparatus adapted for processing information angle modulated on a carrier wave, said carrier wave being characterized by a reduction in amplitude in the presence of noise, a muting circuit comprising:

means for detecting the envelope of said angle modulated carrier wave, said means comprising a first transistor having emitter, base and collector electrodes, said collector electrode being coupled to a source of said carrier wave, a first capacitor coupled between said collector and base electrodes of said first transistor, and a second capacitor coupled from the emitter electrode of said transistor to a reference terminal for filtering out said carrier wave;

means for inverting said detected envelope; and rectifying means coupled to said inverting means for providing a DC voltage representative of troughs in said angle modulated carrier wave suitable for reducing the gain of an associated output amplifier.

3. A muting circuit according to claim 2 wherein said means for inverting said detected envelope and said rectifying means comprises:

a. a second transistor having emitter, base, and collector electrodes, the base electrode of said second transistor being coupled to the emitter electrode of said first transistor, the emitter electrode of said second transistor being coupled to said reference terminal;

b. means for coupling the collector electrode of said second transistor to a terminal adapted for connection to an operating potential supply;

c. a third transistor having emitter, base, and collector electrodes, said base electrode being coupled to the collector electrode of said second transistor;

d. means for coupling the collector electrode of said third transistor to said terminal adapted for connection to an operating potential supply; and e. means for coupling the emitter electrode of said third transistor to a network for providing a DC voltage representative of the troughs in said input carrier wave envelope.

4. A muting circuit according to claim 3 wherein all of said components except said network are fabricated on a monolithic integrated circuit chip.

5. A muting circuit according to claim 3 wherein said network for providing a DC voltage includes a resistor and a capacitor, said capacitor being charged to a voltage porportional to the number of holes in said angle modulated carrier wave envelope.

6. A muting circuit for frequency modulation receivers comprising:

a. means for detecting the envelope of frequency modulated input signal waves including a first transistor having emitter, base, and collector electrodes;

b. means, coupled to said detecting means, for inverting the envelope of said input signal waves including a second transistor having emitter, base, and collector electrodes, the base electrode of said second transistor being coupled to the emitter electrode of said first transistor and the emitter electrode of said second transistor being coupled to a first terminal;

c. means for coupling the collector electrode of said second transistor to an operating potential supply terminal;

d. means, coupled to said inverting means, for rectifying said input signal wave envelope including a third transistor having emitter, base, and collector electrodes, the base electrode of said third transistor being coupled to the collector electrode of said second transistor, the collector electrode of said third transistor being coupled to an operating potential supply terminal; and e. means for coupling the emitter electrode of said third transistor to a network for providing a DC voltage representative of the troughs in said input signal envelope.

7. A muting circuit for frequency modulation receivers according to claim 6 wherein said means for detecting the envelope of frequency modulated input signal waves further includes a first capacitor coupled between the collector and base electrodes of said first transistor and a second capacitor, coupled from the emitter electrode of said first transistor to a reference terminal, for filtering out the carrier wave frequency of said frequency modulated input signal waves.

8. A muting circuit according to claim 7 wherein said second transistor is biased into conduction by a voltage appearing across said second capacitor being the result of input signal waves and stops conduction when the voltage appearing across said second capacitor decreases below the threshold of conduction of said second transistor being a result of holes in said signal waves.

9. A muting circuit according to claim 6 wherein said network for providing a DC voltage includes a resistor and a third capacitor, the voltage developed across said third capacitor being proportional to the number of holes in said angle modulated carrier wave envelope.

* * * * *